US009620986B2

(12) United States Patent
Von Novak, III et al.

(10) Patent No.: US 9,620,986 B2
(45) Date of Patent: Apr. 11, 2017

(54) METHOD AND APPARATUS FOR WIRELESS POWER TRANSFER UTILIZING TRANSMIT COILS DRIVEN BY PHASE-SHIFTED CURRENTS

(71) Applicant: QUALCOMM Incorporated, San Diego, CA (US)

(72) Inventors: William Henry Von Novak, III, San Diego, CA (US); Charles Edward Wheatley, III, San Diego, CA (US); Mei-Li Chi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 95 days.

(21) Appl. No.: 14/830,971

(22) Filed: Aug. 20, 2015

(65) Prior Publication Data

US 2016/0241075 A1    Aug. 18, 2016

Related U.S. Application Data

(60) Provisional application No. 62/115,818, filed on Feb. 13, 2015.

(51) Int. Cl.
*H02J 7/00*    (2006.01)
*H02J 7/02*    (2016.01)
(Continued)

(52) U.S. Cl.
CPC ............... *H02J 7/025* (2013.01); *H02J 7/04* (2013.01); *H02J 50/10* (2016.02)

(58) Field of Classification Search
CPC ...................................................... H02J 7/025
(Continued)

(56) References Cited

U.S. PATENT DOCUMENTS 6,184,651 B1 *    2/2001  Fernandez ............. H02J 7/025
                                                     320/108
2011/0136550 A1   6/2011  Maugars
(Continued)

FOREIGN PATENT DOCUMENTS

WO    WO-2009081115 A1    7/2009
WO    WO-2014070026 A1    5/2014

OTHER PUBLICATIONS

International Search Report and Written Opinion—PCT/US2016/013916 ISA/EPO—Apr. 28, 2016.

*Primary Examiner* — Suresh Memula
(74) *Attorney, Agent, or Firm* — Knobbe, Martens, Olson & Bear LLP

(57) ABSTRACT

An apparatus comprises a first driver circuit having a first output impedance while driving a plurality of couplers with a first current having a first phase to generate a wireless field. A second driver circuit drives the plurality of couplers with a second current having a second phase. A controller causes the second driver circuit to sequentially drive each of the plurality of couplers with the second current while causing the first driver circuit to simultaneously drive the other couplers with the first current. The controller identifies a subset of the plurality of couplers based on detecting a change from the first output impedance in response to each of the plurality of couplers being sequentially driven with the second current. The controller selectively energizes the subset of the plurality of couplers via one or both of the first and second driver circuits to wirelessly transfer the charging power.

30 Claims, 5 Drawing Sheets

(51) Int. Cl.
*H02J 50/10* (2016.01)
*H02J 7/04* (2006.01)
(58) Field of Classification Search
USPC .......................................................... 320/108
See application file for complete search history.

(56) References Cited

U.S. PATENT DOCUMENTS

2012/0313577 A1   12/2012   Moes et al.
2014/0312833 A1*  10/2014   Won ..................... H04B 5/0037
                                                 320/108

* cited by examiner

METHOD AND APPARATUS FOR WIRELESS POWER TRANSFER UTILIZING TRANSMIT COILS DRIVEN BY PHASE-SHIFTED CURRENTS

CROSS REFERENCE TO RELATED APPLICATIONS

This Application claims priority to Provisional Application No. 62/115,818 entitled "METHOD AND APPARATUS FOR WIRELESS POWER TRANSFER UTILIZING TRANSMIT COILS DRIVEN BY PHASE-SHIFTED CURRENTS" filed Feb. 13, 2015. The disclosure of Provisional Application No. 62/115,818 is hereby expressly incorporated in its entirety by reference herein.

FIELD

This application is generally related to wireless power transfer, and more specifically to methods and apparatuses for wireless power transfer utilizing transmit coils driven by phase-shifted currents.

BACKGROUND

Many wireless power transmitters strive to provide an even magnetic field to all chargeable devices, such that all devices may receive a similar amount of power (e.g., a similar voltage is induced in the receive coils of all devices). However, there may be certain circumstances in which the magnetic field should be adjusted to provide more or less power to a particular device. In addition, it may also be useful to detect where a chargeable device is located on a transmitter pad, and which coils to energize for charging. This may reduce wasted power as well as unwanted magnetic field emissions. Furthermore, it may be useful to be able to adjust the efficiency and power handling of the wireless power transfer system. Accordingly, methods and apparatus for wireless power transfer utilizing transmit coils driven by phase-shifted currents are desirable.

SUMMARY

According to some implementations, an apparatus for wirelessly transferring charging power via a wireless field is provided. The apparatus comprises a first driver circuit having a first output impedance while driving a plurality of couplers with a first current having a first phase to generate the wireless field. The apparatus comprises a second driver circuit configured to drive the plurality of couplers with a second current having a second phase. The controller is configured to cause the second driver circuit to sequentially drive each of the plurality of couplers with the second current while causing the first driver circuit to simultaneously drive the other couplers of the plurality of couplers with the first current. The controller is configured to identify a subset of the plurality of couplers based on detecting a change from the first output impedance in response to each of the plurality of couplers being sequentially driven with the second current. The controller is configured to selectively energize the subset of the plurality of couplers via one or both of the first and second driver circuits to wirelessly transfer the charging power.

In some other implementations, a method for wirelessly transferring charging power is provided. The method comprises sequentially driving each of a plurality of couplers with a second current having a second phase by a second driver circuit while simultaneously driving the other couplers of the plurality of couplers with a first current having a first phase by a first driver circuit. The method comprises identifying a subset of the plurality of couplers based on detecting a change in an output impedance of the first driver circuit from a first output impedance present when the first driver circuit drives the first current into the plurality of couplers in response to each of the plurality of couplers being sequentially driven with the second current. The method comprises selectively energizing the subset of the plurality of couplers for wirelessly transferring the charging power.

In yet other implementations, a non-transitory, computer-readable medium comprising code that, when executed, causes an apparatus for wirelessly transferring power to perform a method is provided. The method comprises sequentially driving each of a plurality of couplers with a second current having a second phase by a second driver circuit while simultaneously driving the other couplers of the plurality of couplers with a first current having a first phase by a first driver circuit. The method comprises identifying a subset of the plurality of couplers based on detecting a change in an output impedance of a first driver circuit from a first output impedance present when the first driver circuit drives the first current into the plurality of couplers in response to each of the plurality of couplers being sequentially driven with the second current. The method comprises selectively energizing the subset of the plurality of couplers for wirelessly transferring the charging power.

In yet other implementations, an apparatus for wirelessly transferring charging power is provided. The apparatus comprises means for providing a first current having a first phase, the means for providing a first current having a first output impedance while driving a plurality of couplers with the first current. The apparatus comprises means for providing a second current having a second phase for driving one or more of the plurality of couplers with the second current. The apparatus comprises means for sequentially driving each of the plurality of couplers with the second current while simultaneously driving the other couplers of the plurality of couplers with the first current. The apparatus comprises means for identifying a subset of the plurality of couplers based on detecting a change from the first output impedance. The apparatus comprises means for selectively energizing the subset of the plurality of couplers via one or both of the means for providing the first current and the means for providing the second current to wirelessly transfer the charging power.

In yet other implementations, an apparatus for wirelessly transferring charging power is provided. The apparatus comprises a plurality of couplers each configured to wirelessly couple the charging power to one or more receiver couplers. The apparatus comprises a first driver circuit configured to drive the plurality of couplers with a first current. The apparatus comprises a second driver circuit configured to drive the plurality of couplers with a second current. The apparatus comprises a controller configured to cause the first driver circuit to energize a subset of the plurality of couplers with the first current to wirelessly couple the charging power to a receiver coupler positioned to couple the charging power via the subset of the plurality of couplers. The controller is configured to adjust an output impedance presented to the first driver circuit by causing the second driver circuit to energize one or more couplers of the plurality of couplers not included in the subset of the plurality of couplers with the second current while causing the first driver circuit to energize the subset of the plurality of couplers with the first current.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e,g., a magnetic field or an electromagnetic field) may be received, captured, or coupled by a "receive coupler" to achieve power transfer.

The terminology used herein is for the purpose of describing particular implementations only and is not intended to be limiting on the disclosure. It will be understood that if a specific number of a claim element is intended, such intent will be explicitly recited in the claim, and in the absence of such recitation, no such intent is present. For example, as used herein, the singular forms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
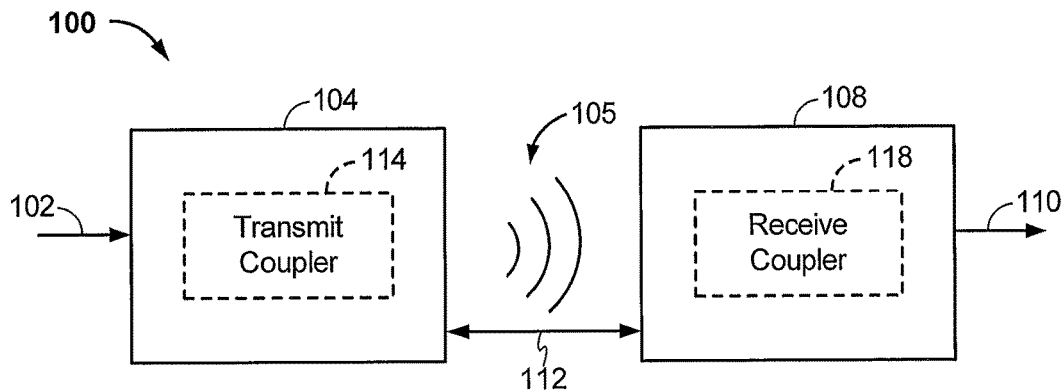
FIG. 1 is a functional block diagram of a wireless power transfer system, in accordance with some implementations.

FIG. 1 is a functional block diagram of a wireless power transfer system 100, in accordance with some implementations. Input power 102 may be provided to a transmitter 104 from a power source (not shown) to generate a wireless (e.g., magnetic or electromagnetic) field 105 via a transmit coupler 114 for performing energy transfer. The receiver 108 may receive power when the receiver 108 is located in the wireless field 105 produced by the transmitter 104. The wireless field 105 corresponds to a region where energy output by the transmitter 104 may be captured by the receiver 108. A receiver 108 including a receiver coupler 118 may couple to the wireless field 105 and generate output power 110 for storing or consumption by a device (not shown in this figure) coupled to the output power 110. Both the transmitter 104 and the receiver 108 are separated by a distance 112. Transfer of energy occurs by coupling energy from the wireless field 105 of the transmit coupler 114 to the receive coupler 118, residing in the vicinity of the wireless field 105, rather than propagating the energy from the transmit coupler 114 into free space.

In one example implementation, power is transferred inductively via a time-varying magnetic field generated by the transmit coupler 114. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are minimal. Resonant inductive coupling techniques may allow for improved efficiency and power transfer over various distances and with a variety of inductive coupler configurations. However, even when resonance between the transmitter 104 and receiver 108 are not matched, energy may be transferred, although the efficiency may be reduced. For example, the efficiency may be less when resonance is not matched.

In some implementations, the wireless field 105 corresponds to the "near-field" of the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114. Efficient energy transfer may occur by coupling a large portion of the energy in the wireless field 105 to the receive coupler 118 rather than propagating most of the energy in an electromagnetic wave to the far field.

Figure 2:
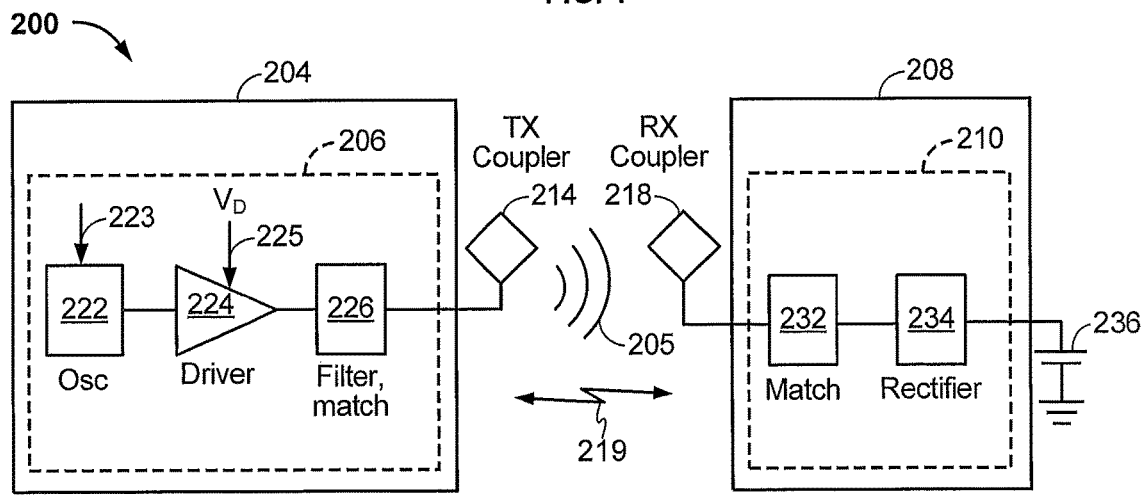
FIG. 2 is a functional block diagram of a wireless power transfer system, in accordance with some other implementations.

FIG. 2 is a functional block diagram of a wireless power transfer system 200, in accordance with some other implementations. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that may be adjusted in response to a frequency control signal 223. The oscillator 222 provides the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 filters out harmonics or other unwanted frequencies and matches the impedance of the transmit circuitry 206 to the impedance of the transmit coupler 214. As a result of driving the transmit coupler 214, the transmit coupler 214 generates a wireless field 205 to wirelessly output power at a level sufficient for charging a battery 236.

The receiver 208 comprises receive circuitry 210 that includes a matching circuit 232 and a rectifier circuit 234. The matching circuit 232 may match the impedance of the receive circuitry 210 to the impedance of the receive coupler 218. The rectifier circuit 234 may generate a direct current (DC) power output from an alternate current (AC) power input to charge the battery 236. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
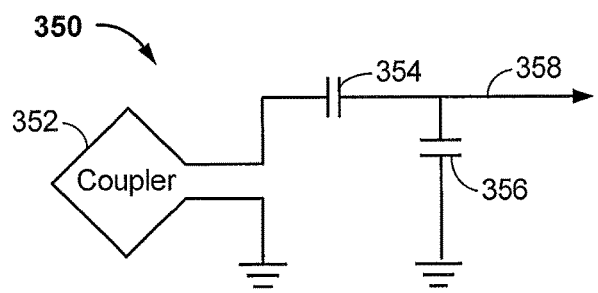
FIG. 3 is a schematic diagram of a portion of transmit circuitry or receive circuitry of FIG. 2 including a transmit or receive coupler, in accordance with some implementations.

FIG. 3 is a schematic diagram of a portion of the transmit circuitry 206 or the receive circuitry 210 of FIG. 2, in accordance with some implementations. As illustrated in FIG. 3, transmit or receive circuitry 350 may include a coupler 352. The coupler 352 may also be referred to or be configured as a "conductor loop", a coil, an inductor, an antenna, or a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added via a capacitor 354 (or the self-capacitance of the coupler 352) to create a resonant structure at a desired resonant frequency. As a non-limiting example, a capacitor 354 and a capacitor 356 may be added to the transmit or receive circuitry 350 to create a resonant circuit that resonates at a resonant frequency. For larger sized couplers using large diameter couplers exhibiting larger inductance, the value of capacitance needed to produce resonance may be lower. Furthermore, as the size of the coupler increases, coupling efficiency may increase. This is mainly true if the size of both transmit and receive couplers increase. For transmit couplers, the signal 358, with a frequency that substantially corresponds to the resonant frequency of the coupler 352, may be an input to the coupler 352. For receive couplers, the signal 358 may be output for use in powering or charging a load.

Figure 4:
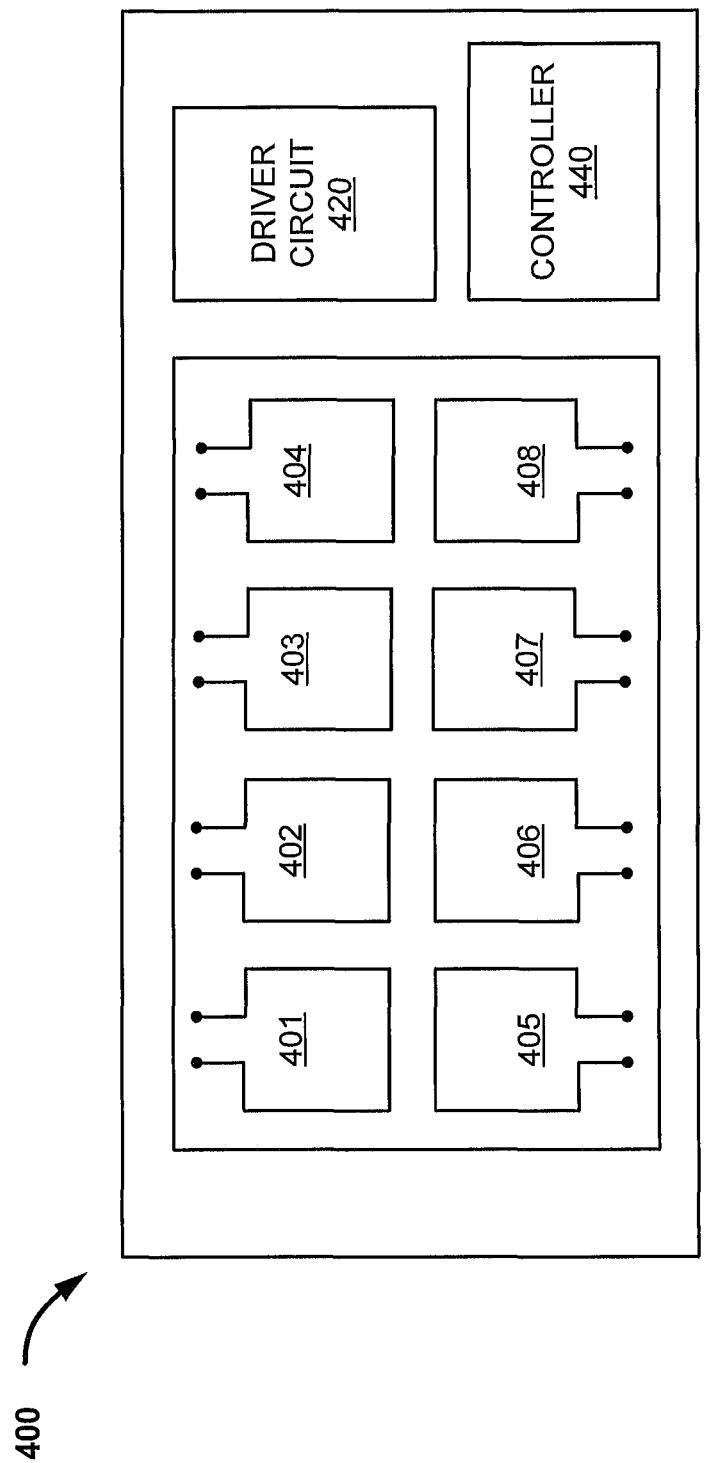
FIG. 4 is a functional block diagram of a wireless power transfer system, in accordance with some implementations.

FIG. 4 is a functional block diagram of a wireless power transfer system 400, in accordance with some implementations. The wireless power transfer system 400 includes a plurality of transmit couplers (e.g., transmit coils or resonators) 401-408. The wireless power transfer system 400 shows eight transmit couplers 401-408, though the present application is not so limited and any number of transmit couplers may be utilized. In some implementations, the transmit couplers 401-408 may correspond to the transmit couplers 114, 214 as previously described in connection with FIGS. 1 and 2, respectively. Moreover, although not shown in FIG. 4, each of the transmit couplers 401-408 may include, form, or form a portion of a resonant circuit (e.g., at least an inductor and a capacitor having values such that each of the transmit couplers 401-408 resonate at a desired resonant frequency when driven substantially at that resonant frequency by a driver circuit 420). In accordance with implementations described herein, the driver circuit 420 is configured to provide a plurality of phase-shifted drive signals to respective ones of the transmit couplers 401-408. In some implementations, the driver circuit 420 may correspond to the driver 224 and/or the transmit circuitry 206 as previously described in connection with FIG. 2. The wireless power transfer system 400 may utilize the plurality of transmit couplers 401-408 to energize different portions of an active charging area over or around the array of transmit couplers 401-408. In one implementation, the driver circuit 420 is configured to drive only transmit couplers 401-408 that are located under chargeable devices that are present, such that the chargeable devices receive power wirelessly while open areas (or areas with foreign materials over them) do not receive power wirelessly (i.e., lower levels, if any, of a wireless field for charging are present in the open areas). In some implementations, the current driven to each of the transmit couplers 401-408 may be fixed. In some implementations, a single driver (see FIG. 6) within the driver circuit 420 may drive one or more of the transmit couplers 401-408. In some other implementations, the driver circuit 420 includes more than one driver that drives multiple transmit couplers 401-408 concurrently. In some implementations, the wireless power transfer system 400 may additionally include a controller 440 configured to provide control signals to one or more components within at least the driver circuit 420 in order to affect the functionality described herein. In some implementations, the controller 440 may correspond to at least a portion of the transmit circuitry 206 that provides control signals, for example, the frequency control signal 223, the input voltage signal 225 ($V_D$), or any other control signal.

In some cases, it may be desirable to provide an even magnetic field to all chargeable devices present over the array of transmit couplers 401-408 (e.g., over the transmit pad), so that a similar induced voltage appears across a receive coupler of each of the present chargeable devices. However, under certain circumstances, it may be desirable to adjust the magnetic field to provide more or less power to a specific chargeable device (not shown in FIG. 4). Furthermore, in some implementations, it may be desirable to determine the location of a particular chargeable device on the wireless power transmitter, and thus, which of the plurality of transmit couplers 401-408 should be energized to most efficiently charge the particular chargeable device. This may reduce the amount of wasted power as well as unwanted magnetic field emissions. In addition, to more precisely adjust the efficiency and power handling of the wireless power transfer system 400, it may be desirable to be able to adjust the complex impedance load on the driver(s) of the driver circuit 420.

The driver circuit 420 may be configured to drive at least a subset of the transmit couplers 401-408 with current waveforms that are phase shifted with respect to one another. Since the total magnetic field at any particular location is directly related to the phase differential between all energized transmit couplers 401-408, the use of phase-shifted currents may be utilized to control wireless power transfer. As a simple example, if two adjacent elements (e.g., coupler 401 and coupler 402) are driven simultaneously, the net magnetic field provided to a chargeable device located above or otherwise in proximity to those elements is directly proportional to the cosine of the magnetic field produced by the energized coupler 401 plus the cosine of the magnetic field having the offset with respect to the coupler 401 produced by the energized coupler 402. If there is no phase offset between currents driving the coupler 401 and the coupler 402, the net magnetic field having a substantially vertical component (e.g., the H-field perpendicular to charging surface described herein as the Z-field or net Z-axis H field) will be maximized. If the phase offset is 180°, the net Z-field may be substantially zero. In general, the net magnetic field strength caused by energizing any two couplers with separate AC currents having a phase offset between them will be proportional to the magnitude of the vector sum (e.g., the partial field components in each of the x-, y-, and z-directions) of the magnetic fields present, according to Equation 1 below:

$$\text{TOTAL FIELD} = |\Sigma_{i=0}^{N} H_i| \quad \text{EQ. 1:}$$

To detect the presence of chargeable devices, two or more drivers of the driver circuit 420 may drive separate AC currents having different phases to adjacent transmit couplers (e.g., couplers 401 and 402). If the energized transmit couplers 401 and 402 are both located under (e.g., overlap) a receive coupler of a chargeable device, the two transmit couplers 401 and 402 will have a fairly high degree of coupling with each other, and a complex impedance load appearing at the output of each driver will shift from that which would appear at the output if only one of the drivers energized both transmit couplers due to the feedback of the phased current of the other driver. On the other hand, if the transmit couplers are open (e.g., there is no receiver coupler located over them) coupling between the two transmit couplers will be relatively low, and the drivers will see only a minimal change in complex impedance at the output of the drivers. To adjust the complex impedance sensed by a particular driver, a second driver can apply a "compensating" drive current to one of the transmit couplers located under the receive coupler of the chargeable device. Several different driver schemes are contemplated, as will be described in connection with FIGS. 5-7 below.

Figures 5, 6, 7:
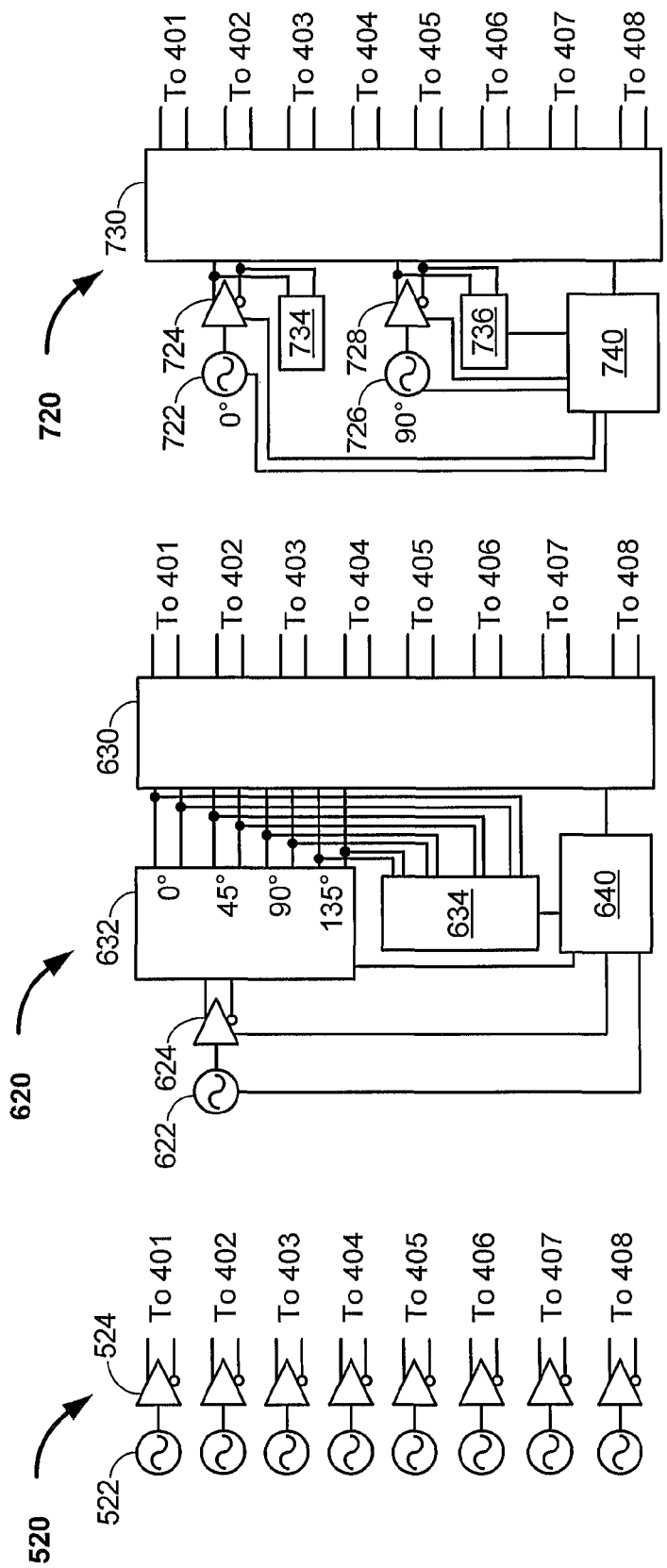
FIG. 5 is a schematic diagram of a driver circuit of a wireless power transfer system, in accordance with some implementations.
FIG. 6 is a schematic diagram of another driver circuit of a wireless power transfer system, in accordance with some implementations.
FIG. 7 is a schematic diagram of another driver circuit of a wireless power transfer system, in accordance with some implementations.

FIG. 5 is a schematic diagram of a driver circuit 520 of a wireless power transfer system, in accordance with some implementations. The driver circuit 520 may be an implementation of the driver circuit 420 of FIG. 4. In the implementation of FIG. 5, each of the transmit couplers 401-408 are driven by a respective, separate driver 524, each driver 524 receiving an oscillator signal from a respective oscillator 522. A controller (not shown) may determine what phase differential should be applied to each transmit coupler 401-408 and the separate drivers 524 may generate the drive signal for each transmit coupler 401-408 accordingly. This allows for separate adjustment of every transmit coupler 401-408 of the wireless power transfer system 400. Each driver 524 may be driven to provide the phase-shifted drive signals as described above and further below.

FIG. 6 is a schematic diagram of another driver circuit 620 of a wireless power transfer system, in accordance with some implementations. The driver circuit 620 may be an implementation of the driver circuit 420 of FIG. 4. In FIG. 6, each (or at least multiple) of the transmit couplers 401-408 may be driven by the same driver 624, which receives an oscillator signal from an oscillator 622. The output of the driver 624 is input to a phase delay network 632, which provides a variable phase delay of the drive signal from the driver 624 to certain of the transmit couplers 401-408. For example, the phase delay network 632 is shown to provide outputs that delay the drive signal from the driver 624 by 0°, 45°, 90°, and 135°, although any other specific phase delays may also be contemplated. Such implementations provide a reduced component count while allowing a single driver 624 to drive several of the transmit couplers 401-408 with currents having several different phases.

Such implementations may include either a phase delay for each transmit coupler or a switch matrix that switches all transmit couplers 401-408 between the several phase delays. For example, as shown in FIG. 6, each of the different phase delayed outputs of the phase delay network 632 may be input to a switching circuit 630 that is configured to provide a particular phase delayed output to particular one(s) of the transmit couplers 401-408. The driver circuit 620 may additionally include a complex impedance sensor 634, which may be configured to sense or determine a complex impedance present at an output of the driver 624, or at an output of the phase delay network 632. In some implementations, the complex impedance sensor 634 may be configured to measure a complex impedance appearing at the outputs of each of the delayed outputs of the phase delay network 632, so individual output impedances may be detected for each delayed current source (e.g., each output of the phase delay network 632 acting as an individual driver). In some implementations, the complex impedance sensor 634 may be configured to measure a voltage and a current at the output of the driver 624 (or at one or more of the outputs of the phase delay network 632) and determine the complex impedance based on those measurements. This determined complex impedance may be used to determine a presence of at least one chargeable device located over at least a portion of the transmit couplers 401-408, as will be described in more detail below.

FIG. 6 additionally includes a controller 640, which may be operably connected to each of the oscillator 622, the driver 624, the phase delay network 632, the switching circuit 630 and the impedance sensor 634 and may be configured to provide global or general control for the circuit of FIG. 6.

FIG. 7 is a schematic diagram of another driver circuit 720 of a wireless power transfer system, in accordance with some implementations. The driver circuit 720 includes two drivers 724 and 728, each driven by an oscillator 722 and 726, respectively, providing oscillator signals that are phase shifted by 90° (or by some other phase) from one another. The outputs of the two drivers 724 and 728 are input to a switching circuit 730 that is configured to provide a particular one of the two phase delayed outputs to particular one(s) of the transmit coupler 401-408. The outputs of the drivers 724 and 728 may be connected to respective complex impedance sensors 734 and 736, respectively, which may operate as previously described in connection with the complex impedance sensor 634 of FIG. 6.

FIG. 7 additionally includes a controller 740, which may be operably connected to each of the first and second oscillators 722, 726, the first and second drivers 724, 728, the switching circuit 730, and the first and second impedance sensors 734, 736 and may be configured to provide global or general control for the circuit of FIG. 7.

Implementations in accordance with FIG. 7 could energize a plurality of transmit couplers, each with one of the two phase-shifted currents, to provide power control. For example, as shown in TABLE 1, by energizing several of the transmit couplers 401-404, for example, with one of the two phase-shifted currents, gradations of full power can be provided to a chargeable devices having a receive coupler located at least partially over each of the transmit couplers 401-404.

TABLE 1

| Coupler 401 | Coupler 402 | Coupler 403 | Coupler 404 | Power Across 401-404 |
|---|---|---|---|---|
| 0° | 0° | 0° | 0° | 100% |
| 0° | 0° | 0° | 90° | 79% |
| 0° | 0° | 90° | 90° | 71% |

Where coarser control is desired, a larger phase shift (e.g., 120° rather than 90°) may be utilized between the two drivers 724 and 728. Exemplary normalized power outputs are shown in TABLE 2.

TABLE 2

| Coupler 401 | Coupler 402 | Coupler 403 | Coupler 404 | Power Across 401-404 |
|---|---|---|---|---|
| 0° | 0° | 0° | 0° | 100% |
| 0° | 0° | 0° | 120° | 66% |
| 0° | 0° | 120° | 120° | 50% |

Figure 8:
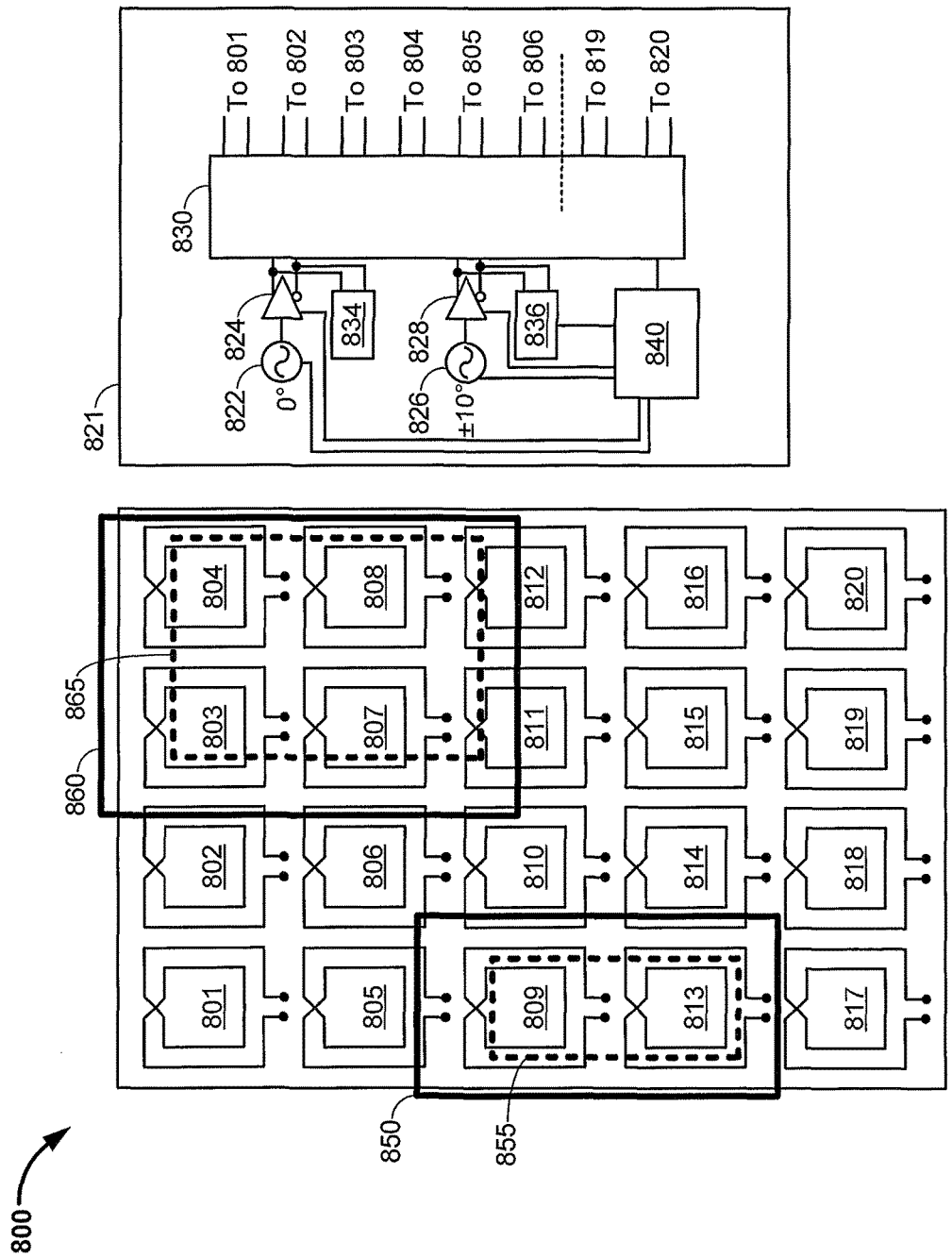
FIG. 8 is a functional block diagram of a wireless power transfer system, in accordance with some implementations.

FIG. 8 is a functional block diagram of a wireless power transfer system 800, in accordance with some implementations. The wireless power transfer system 800 includes a plurality of transmit couplers 801-820 organized in an array (e.g., a 4×5 coupler array). Each of the couplers 801-820 may include an inductor and, in some implementations also a capacitor, such that each coupler 801-820 is configured to resonate at or near a resonance frequency defined by the values of the inductance and capacitance of the inductor and capacitor, respectively. The wireless power transfer system 800 additionally includes a driver circuit 821 having a dual driver implementation, similar to that previously described in connection with FIG. 7. For example, a first oscillator 822 provides an oscillator signal to a first driver 824, while a second oscillator 826 provides an oscillator signal having a small phase shift compared to the oscillator signal of the first oscillator 822 (e.g., ±10°) to a second driver 828. The first driver 824 may be a part of, or also known as, "means for providing a first current having a first phase," while the second driver 828 may be a part of or also known as, "means for providing a second current having a second phase." The outputs of each of the first and second drivers 824, 828 are input to a switching circuit 830 configured to selectively provide one of the outputs from first or second drivers 824, 828 to one or more of the transmit couplers 801-820. The switching circuit 830 may be a part of, or also known as, "means for electrically connecting." First and second complex impedance sensors 834 and 836, respectively, are configured to detect or determine a complex impedance appearing at an output of the first and second drivers 824, 828, respectively. At least the first complex impedance sensor 834 may be a part of, or also known as, "means for detecting a synchronous change in the output impedance."

FIG. 8 additionally includes a controller 840, which may be operably connected to each of the first and second oscillators 822, 826, the first and second drivers 824, 828, the switching circuit 830, and the first and second impedance sensors 834, 836 and may be configured to provide global or general control for the circuit of FIG. 8. For this reason, the controller 840 may be a part of, or also known as, "means for sequentially driving each of the plurality of couplers with the second current while simultaneously driving the other couplers of the plurality of couplers with the first current," "means for identifying a subset of the plurality of couplers," "means for selectively energizing the subset of the plurality of couplers," "means for adjusting an amount of wirelessly transferred power," "means for adjusting an output impedance," and "means for adjusting the phase of the second current."

In FIG. 8, a first chargeable device 850 having a receive coupler (e.g., a resonator coil) 855 may be placed on a pad comprising the plurality of transmit couplers 801-820, followed by a second chargeable device 860 having a receive coupler (e.g., a resonator coil) 865. Before any chargeable devices are placed over the plurality of transmit couplers 801-820, several detection methods might be utilized to detect the position of the chargeable devices. For example, all couplers 801-820 could be sequentially selectively connected to the first driver 824 via the switching circuit 830. Regular beacons could be pulsed through each of the transmit couplers 801-820 and a change of a complex impedance appearing at an output of the first driver 824 caused by the presence of a device over the respective transmit coupler(s) 801-820 could be sensed via, e.g., the impedance sensors 834 and 836.

Once a device is placed, a next determination is which transmit couplers 801-820 to continuously energize for efficient wireless power transfer. Once the first device 850 having the receive coupler 855 is placed on the pad, each of the transmit couplers 801-820 are sequentially energized by the first driver 824. A change in a complex impedance appearing at the output of the first driver 824 may be caused/observed due to the transmit coupler 805 interacting with the first device 850, since the case of the first device 850 is located over at least a portion of this coupler (e.g., sensed by impedance sensors 834 and 836). Likewise, interactions between the first device 850 and the transmit couplers 806, 809, 810, 813 and 814, when each connected to the first driver 824, will also cause the change in the complex impedance appearing at the output of the first driver 824 since the first chargeable device 850 is located over at least a portion of those transmit couplers. This determination of the changed complex impedance at the output of the first driver 824 for each of the transmit couplers 805, 806, 809, 810, 813 and 814 is sufficient to identify that something is located on the pad. Each of the transmit couplers 805, 806, 809, 810, 813 and 814 are then connected to the first driver 824 and the first chargeable device 850 may receive charging power wirelessly via its receive coupler 855. However, the above determination only identifies which transmit couplers have an object of some metallic or ferromagnetic character located over them, but not necessarily which transmit couplers are actually coupled to the receive coupler 855 of the chargeable device 850.

Accordingly, it may be desirable to determine which transmit couplers 805, 806, 809, 810, 813, and 814 are actually driving the receive coupler 855 and which transmit couplers 805, 806, 809, 810, 813, and 814 are merely causing a complex impedance shift at the output of the first driver 824 due to the presence of the chargeable device's 850 case or other metallic parts. To accomplish this, the second driver 828 may be sequentially connected to one of the transmit couplers 805, 806, 809, 810, 813 and 814, while the first driver 824 remains connected to each of the other transmit couplers 805, 806, 809, 810, 813 and 814. The sinusoidal alternating current waveforms output by the first driver 824 and by the second driver 828 are close in phase (e.g., separated by approximately 10°). Thus, the net magnetic field change caused by this switch of one of the transmit couplers 805, 806, 809, 810, 813 and 814 to the second driver 828 will be minor. To detect which of the transmit couplers 805, 806, 809, 810, 813 and 814 are under or overlap (e.g., coupled to and able to wirelessly transfer power to) the receive coupler 855, the first driver 824 remains connected to each of the transmit couplers 805, 806, 809, 810, 813 and 814 and the complex impedance is determined at the output of the first driver 824 by the first complex impedance sensor 834. The second driver 828 is then sequentially connected to each one of the transmit couplers 805, 806, 809, 810, 813 and 814, while the first driver 824 continues to drive the others of the transmit couplers 805, 806, 809, 810, 813 and 814. The first complex impedance sensor 834 will sense a change in the complex impedance appearing at the output of the first driver 824 only when the second driver 828 is connected to, and drives with the second current, the transmit couplers 809 and 813, due to the slightly out-of-phase power being coupled to the receive coupler 855 from the second driver 828 through either of the transmit couplers 809 and 813. Such a change from the first complex output impedance of the first driver 824 (e.g., complex output impedance presented to the first driver 824) will not occur when the second driver 828 sequentially drives each of the other transmit couplers 805, 806, 810, and 814, since they are not magnetically coupled to the receive coupler 855 of the first chargeable device 850.

In an optional aspect, the second oscillator 826 may then adjust the phase of its output (e.g., from 10° to −10°), which will cause a synchronous change in the complex impedance appearing at the output of the first driver 824 for the same reasons as just described for the transmit couplers 809 and 813, but not for the transmit couplers 805, 806, 810, and 814. A receiver voltage (e.g., an open-circuit or loaded receiver voltage) induced in the receive coupler 855 may be sensed at the chargeable device 850 and when the second driver 828 is connected to a transmit coupler underneath the receive coupler 855, a drop in the receiver voltage may be detected. In some implementations, the chargeable device 850 may be configured to communicate an indication of this drop in receiver voltage to the wireless power transmitter in order to verify which transmit couplers 801-820 are actually providing wireless power transfer to the chargeable device 850.

Once all previously energized transmit couplers (e.g., the transmit couplers 805, 806, 809, 810, 813 and 814) have been sequentially switched as described above, the first driver 824 is connected only to the transmit couplers that have been determined to actually provide wireless power transfer (e.g., the transmit couplers 809 and 813), while all other transmit couplers are disconnected from the first and second drivers 824, 828. Since the first chargeable device 850 is now receiving wireless power via a sinusoidal AC current provided by the first driver 824, via the switching circuit 830, periodic new scans may be performed by the second driver 828 in the manner previously described. The scanning by the second driver 828 would not substantially affect the wireless power transfer to the first chargeable device 850.

In some implementations, the second chargeable device 860 may then be placed on the pad as shown in FIG. 8. The periodic scan by the second driver 828 may determine that the second chargeable device 860 is located over at least a portion of the transmit couplers 802, 803, 804, 806, 807, 808, 810, 811 and 812. Thus, the transmit couplers 802, 803, 804, 806, 807, 808, 810, 811 and 812 may be energized by the first driver 824 via the switching circuit 830. Next, as previously described, a second scan is performed to determine which transmit couplers are located under the receive coupler 865 (e.g., which transmit couplers are actually wirelessly transmitting power to the receive coupler 865). This second scan will detect the transmit couplers 803, 804, 807 and 808, though transmit couplers 812 and 811 may also have a marginal detection (e.g., a very small voltage change or a very small complex impedance change) at the output of the first driver 824 when the inputs of the couplers 812 and 811 are switched from the first driver 824 to the second driver 828. The system 800 may make a determination as to whether this very small complex impedance change exceeds a predetermined threshold for positive detection. If transmit couplers 812 and 811 are removed as a result of this detection, a final determination may be made based on the resulting induced receiver voltage in the receive coupler 865. If the induced receiver voltage (or any other monitored coupling metric) declines to a level that would threaten power transfer, the above determination may be reversed and the transmit couplers 812 and 811 may be re-connected to the first driver 824.

Note that in the above examples, the first driver 824 is utilized to supply power while the second driver 828 is utilized as a "testing" or scanning power source. In some implementations, the first driver 824 may be a high power, efficient driver and the second driver 828 may be a low cost, smaller driver. In other implementations, the first and second drivers 824, 828 may be substantially the same driver and their respective roles may be periodically reversed. One advantage may be higher total power output, since a higher output power may be achieved from two fixed-power drivers, by driving a portion of the transmit couplers 801-820 with one of the first and second drivers 824, 828 and the other transmit couplers with the other of the first and second drivers 824, 828. For example, in the above-mentioned implementations, the transmit couplers 809 and 810 could be driven by the first driver 824 (to power the first chargeable device 850), while the transmit couplers 803, 804, 807 and 808 could be driven by the second driver 828 (to power the second chargeable device 860). In such implementations, periodically these six transmit couplers could all be driven by the first driver 824, while the second driver 828 performs a scan for new devices, and then return to the prior mix of two-driver powering once the scan is complete.

In some implementations, there may be an ideal complex impedance into which the first driver 824 should drive current in order to operate at peak efficiency. The complex impedance may comprise a real (i.e., resistive) component and an imaginary (i.e., reactive) component. The real component will be set by the load, but the imaginary component is set based on several factors including but not limited to the size and metal content of the chargeable device 850, the tuning of the receive coupler, and the level of wireless power transferred. In some implementations, the second driver 828 may be utilized to normalize or adjust the complex impedance sensed at the output of the first driver 824. This may be done by driving, via the second driver 828, a current having the opposite phase (e.g., power factor) characteristic into one or more of the transmit couplers located at least partially under a chargeable device 850 located on the pad. For example, if the complex impedance sensed at the output of the first driver 824 is slightly more capacitive (i.e., the current waveform leads the voltage waveform by too much) than is ideal while driving the transmit couplers 803, 804, 807, 808, 811 and 812, the second oscillator 826 may generate a current waveform that is lagging (i.e., where the coupled signal opposes the overly-capacitive complex impedance) into one or more of the transmit couplers 803, 804, 807, 808, 811 or 812 in order to adjust the complex impedance sensed at the output of the first driver 824 in the inductive direction. This may cancel or substantially reduce the capacitive complex impedance sensed at the output of the first driver 824.

For example, in one implementation, the second driver 828 may selectively drive the transmit coupler 811 or 812, which are located only partially under the receive coupler 865. However, if this adjustment is insufficient to remove or sufficiently attenuate the undesirable portion of the complex impedance appearing at the output of the first driver 824, then the lag of the current waveform output from the second driver 828 may be increased, or the secondary driver 828 may instead (or additionally) selectively drive any of the transmit couplers 803, 804, 807 or 808, since the larger area of the portion of the transmit couplers located under the receive coupler 865 will have a proportionally larger effect on the adjustment of the complex impedance sensed at the output of the first driver 824 for a given current lag. Although the second driver 828 may sense or drive current into an extremely poor or undesirable complex impedance, since it is being used to compensate for an already-poor complex impedance as sensed at the output of the first driver 824, such a condition may provide a net improvement in the efficiency of the system 800 due to the much higher power that the first driver 824 is driving at an ideal or nearly ideal complex impedance.

Figure 9:
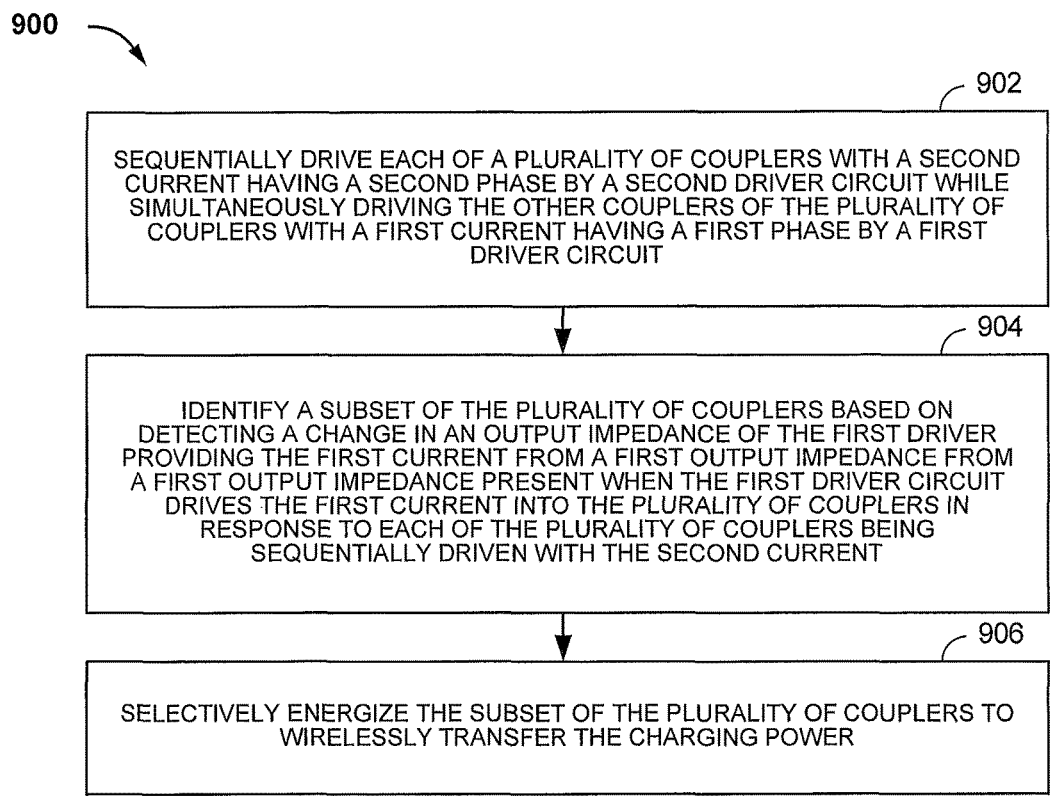
FIG. 9 is a flowchart depicting a method for wireless power transfer utilizing transmit coils driven by phase-shifted currents, in accordance with some implementations.

FIG. 9 is a flowchart 900 depicting a method for wireless power transfer utilizing transmit coils driven by phase-shifted currents, in accordance with some implementations. The flowchart 900 is described herein with reference to any of FIGS. 4-8. In some implementations, one or more of the blocks in flowchart 900 may be performed by a wireless power transfer system, such as that shown in FIG. 4 or 8. Although the flowchart 900 is described herein with reference to a particular order, in various implementations, blocks herein may be performed in a different order, or omitted, and additional blocks may be added.

Block 902 includes sequentially driving each of a plurality of couplers with a second current having a second phase by a second driver circuit while simultaneously driving the other couplers of the plurality of couplers with a first current having a first phase by a first driver circuit. For example, as previously described in connection with FIG. 8, an apparatus for wirelessly transferring charging power may comprise a first driver circuit 824 having a first output impedance and configured to drive a plurality of couplers 802, 803, 804, 806, 807, 808, 810, 811 and 812 with a first current having a first phase to generate a wireless field. The apparatus may comprise a second driver circuit 828 configured to drive the plurality of couplers 802, 803, 804, 806, 807, 808, 810, 811 and 812 with a second current having a second phase. The apparatus further comprises a controller 840 configured to cause the second driver circuit 828 to sequentially drive each of the plurality of couplers 802, 803, 804, 806, 807, 808, 810, 811 and 812 with the second current while causing the first driver circuit 824 to simultaneously drive the other couplers of the plurality of couplers 802, 803, 804, 806, 807, 808, 810, 811 and 812 with the first current.

Block 904 includes identifying a subset of the plurality of couplers based on detecting a change in an output impedance of the first driver circuit from a first output impedance present when the first driver circuit drives the first current into the plurality of couplers in response to each of the plurality of couplers being sequentially driven with the second current. For example, the controller 840 is configured to identify a subset 803, 804, 807, 808, and possibly 811 and 812 of the plurality of couplers 802, 803, 804, 806, 807, 808, 810, 811 and 812 based on detecting a change from the first output impedance in response to each of the plurality of couplers being sequentially driven with the second current. This may establish a reference "first output impedance." Each of the transmit couplers 803, 804, 807, 808, and possibly 811 and 812 are magnetically coupled to the receive coupler 865 of the chargeable device 860, being located at least partially underneath the receive coupler 865 of the chargeable device 860. Thus, when each of the transmit couplers 803, 804, 807, 808, and possibly 811 and 812 is sequentially driven with the second current from the second driver 828, while the other couplers of the plurality of transmit couplers 802, 803, 804, 806, 807, 808, 810, 811 and 812 are simultaneously driven with the first current from the first driver 824, the first impedance sensor 834 will detect a change in the output impedance of the first driver 824 from its above-mentioned first output impedance reference value. However, this change in output impedance of the first driver 824 will not occur when the transmit couplers 802, 806 and 810 are driven with the second current from the second driver 828, while the other couplers of the plurality of transmit couplers 802, 803, 804, 806, 807, 808, 810, 811 and 812 are simultaneously driven with the first current from the first driver 824 because they are not magnetically coupled to the receive coupler 865 of the chargeable device 860 (e.g., not located under the receive coupler 865). Thus, utilizing the complex output impedance sensed by the first impedance sensor 824, the controller 840 may identify the subset of transmit couplers 803, 804, 807, 808, and possibly 811 and 812. This subset of couplers have thus been identified as those couplers that would actually transfer power to the receive coupler 865 of the chargeable device 860.

Block 906 includes selectively energizing the subset of the plurality of couplers to wirelessly transfer the charging power. For example, the controller 840 is configured to selectively energize the subset 803, 804, 807, 808, and possibly 811 and 812 of the plurality of couplers 802, 803, 804, 806, 807, 808, 810, 811 and 812 via one or both of the first and second driver circuits 824, 828 to wirelessly transfer the charging power.

In some implementations, a portion of each coupler in the plurality of couplers 802, 803, 804, 806, 807, 808, 810, 811 and 812 overlaps a chargeable device 850, 860. In some implementations, the change from the first output impedance indicates a presence of a coupler 855, 865 of a chargeable device 850, 860 magnetically coupled with at least one of the plurality of couplers 802, 803, 804, 806, 807, 808, 810, 811 and 812. In some implementations, detecting the change in the output impedance of the first driver circuit 824 is based on detecting a change in a voltage at an output of the first driver circuit 824. For example, the controller 840 may be configured to detect the change from the first output impedance based on a change in a voltage at an output of the first driver circuit 824.

In some other implementations, the flowchart 900 may further include (not shown) adjusting an amount of wirelessly transferred power by selectively adjusting a number of couplers in the subset that are energized with the first current, and energizing the other couplers in the subset with the second current. For example, the controller 840 may be configured to adjust an amount of wirelessly transferred power by selectively adjusting a number of couplers in the subset 803, 804, 807, 808, and possibly 811 and 812 energized with the first current, the other couplers in the subset 803, 804, 807, 808, and possibly 811 and 812 energized with the second current.

In some other implementations, the flowchart 900 may further include (not shown) adjusting the first output impedance of the first driver circuit 824 to a second output impedance by energizing one or more couplers of the subset 803, 804, 807, 808, and possibly 811 and 812 with the second current while energizing the other couplers of the subset 803, 804, 807, 808, and possibly 811 and 812 with the first current. In such implementations, the first driver circuit 824 may operate at a higher efficiency at the second output impedance compared to the first output impedance. For example, the controller 840 may be further configured to adjust the first output impedance of the first driver circuit 824 to a second output impedance by causing the second driver circuit 828 to energize one or more couplers of the subset 803, 804, 807, 808, and possibly 811 and 812 with the second current while causing the first driver circuit 824 to energize the other couplers of the subset 803, 804, 807, 808, and possibly 811 and 812 with the first current.

In some other implementations, the flowchart 900 may further include (not shown) electrically connecting the first driver circuit 824 to one or more of the plurality of couplers 802, 803, 804, 806, 807, 808, 810, 811 and 812 and electrically connecting the second driver circuit 828 to one or more other of the plurality of couplers 802, 803, 804, 806, 807, 808, 810, 811 and 812. For example, the apparatus of FIG. 8 may further comprise a switching circuit 830 configured to electrically connect the first driver circuit 824 to one or more of the plurality of couplers 802, 803, 804, 806, 807, 808, 810, 811 and 812 and electrically connect the second driver circuit 828 to one or more other of the plurality of couplers 802, 803, 804, 806, 807, 808, 810, 811 and 812.

In some other implementations, the flowchart 900 may further include (not shown) verifying the subset of the plurality of couplers by, for each coupler in the subset: adjusting the phase of the second current driving the coupler while the other couplers of the plurality of couplers are driven with the first current, and detecting a synchronous change in the output impedance of the first driver circuit. For example, the apparatus of FIG. 8 may further include an impedance sensor 834, 836. Moreover, the controller 840 may be further configured to verify the subset 803, 804, 807, 808, and possibly 811 and 812 of the plurality of couplers 802, 803, 804, 806, 807, 808, 810, 811 and 812 by, for each coupler in the subset: adjusting the phase of the second current driving the coupler while the other couplers of the plurality of couplers are driven with the first current, and detecting a synchronous change in the output impedance of the first driver circuit 824 utilizing the impedance sensor 834.

In some other implementations, the flowchart 900 may further include (not shown) detecting the plurality of couplers 802, 803, 804, 806, 807, 808, 810, 811 and 812 based on a change in the first impedance of the first driver circuit 824 caused by at least a portion of each of the plurality of couplers 802, 803, 804, 806, 807, 808, 810, 811 and 812 overlapping a chargeable device 850, 860. For example, the controller 840 may be configured to detect the plurality of couplers 802, 803, 804, 806, 807, 808, 810, 811 and 812 based on a change in the first impedance of the first driver circuit 824 caused by at least a portion of each of the plurality of couplers 802, 803, 804, 806, 807, 808, 810, 811 and 812 overlapping a chargeable device 850, 860 disposed on the apparatus of FIG. 8. In implementations described herein, the subset 803, 804, 807, 808, and possibly 811 and 812 of the plurality of couplers 802, 803, 804, 806, 807, 808, 810, 811 and 812 transfer wireless power to the chargeable devices 850, 860 disposed on the apparatus of FIG. 8.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for wirelessly transferring charging power via a wireless field, comprising:
a first driver circuit having a first output impedance and configured to drive a plurality of couplers with a first current having a first phase to generate the wireless field;
a second driver circuit configured to drive the plurality of couplers with a second current having a second phase; and
a controller configured to:
cause the second driver circuit to sequentially drive each of the plurality of couplers with the second current while causing the first driver circuit to simultaneously drive the other couplers of the plurality of couplers with the first current,
identify a subset of the plurality of couplers based on detecting a change from the first output impedance in response to each of the plurality of couplers being sequentially driven with the second current, and
selectively energize the subset of the plurality of couplers via one or both of the first and second driver circuits to wirelessly transfer the charging power.

2. The apparatus of claim 1, wherein at least a portion of each coupler in the plurality of couplers overlaps a chargeable device disposed on the apparatus.

3. The apparatus of claim 1, wherein detecting the change from the first output impedance indicates a presence of a coupler of a chargeable device magnetically coupled with at least one of the plurality of couplers.

4. The apparatus of claim 1, wherein the controller is configured to detect the change from the first output impedance based on a change in a voltage at an output of the first driver circuit.

5. The apparatus of claim 1, wherein the controller is configured to adjust an amount of wirelessly transferred power by selectively adjusting a number of couplers in the subset energized with the first current, the other couplers in the subset energized with the second current.

6. The apparatus of claim 1, wherein the controller is further configured to adjust the first output impedance of the first driver circuit to a second output impedance by causing the second driver circuit to energize one or more couplers of the subset with the second current while causing the first driver circuit to energize the other couplers of the subset with the first current.

7. The apparatus of claim 6, wherein the first driver circuit operates at a higher efficiency at the second output impedance compared to the first output impedance.

8. The apparatus of claim 1, further comprising a switching circuit configured to electrically connect the first driver circuit to one or more of the plurality of couplers and electrically connect the second driver circuit to one or more other of the plurality of couplers.

9. The apparatus of claim 1, further comprising an impedance sensor, wherein the controller is further configured to verify the subset of the plurality of couplers by, for each coupler in the subset:
adjusting the phase of the second current driving the coupler while the other couplers of the plurality of couplers are driven with the first current, and
detecting a synchronous change in the output impedance of the first driver circuit utilizing the impedance sensor.

10. The apparatus of claim 1, wherein the controller is configured to detect the plurality of couplers based on a change in the first impedance of the first driver circuit caused by at least a portion of each of the plurality of couplers overlapping a chargeable device disposed on the apparatus.

11. The apparatus of claim 1, wherein the subset of the plurality of couplers transfer wireless power to a chargeable device disposed on the apparatus.

12. A method for wirelessly transferring charging power, comprising:
sequentially driving each of a plurality of couplers with a second current having a second phase by a second driver circuit while simultaneously driving the other couplers of the plurality of couplers with a first current having a first phase by a first driver circuit,
identifying a subset of the plurality of couplers based on detecting a change in an output impedance of the first driver circuit from a first output impedance present when the first driver circuit drives the first current into the plurality of couplers in response to each of the plurality of couplers being sequentially driven with the second current, and
selectively energizing the subset of the plurality of couplers to wirelessly transfer the charging power.

13. The method of claim 12, wherein at least a portion of each coupler in the plurality of couplers overlaps a chargeable device.

14. The method of claim 12, wherein the change from the first output impedance indicates a presence of a coupler of a chargeable device magnetically coupled with at least one of the plurality of couplers.

15. The method of claim 12, wherein detecting the change in the output impedance of the first driver circuit is based on detecting a change in a voltage at an output of the first driver circuit.

16. The method of claim 12, further comprising adjusting an amount of wirelessly transferred power by selectively adjusting a number of couplers in the subset that are energized with the first current, and energizing the other couplers in the subset with the second current.

17. The method of claim 12, further comprising adjusting the first output impedance of the first driver circuit to a second output impedance by energizing one or more couplers of the subset with the second current while energizing the other couplers of the subset with the first current.

18. The method of claim 17, wherein the first driver circuit operates at a higher efficiency at the second output impedance compared to the first output impedance.

19. The method of claim 12, further comprising electrically connecting the first driver circuit to one or more of the plurality of couplers and electrically connecting the second driver circuit to one or more other of the plurality of couplers.

20. The method of claim 12, further comprising verifying the subset of the plurality of couplers by, for each coupler in the subset:
   adjusting the phase of the second current driving the coupler while the other couplers of the plurality of couplers are driven with the first current, and
   detecting a synchronous change in the output impedance of the first driver circuit.

21. The method of claim 12, further comprising detecting the plurality of couplers based on a change in the first impedance of the first driver circuit caused by at least a portion of each of the plurality of couplers overlapping a chargeable device.

22. An apparatus for wirelessly transferring charging power, comprising:
   means for providing a first current having a first phase, the means for providing a first current having a first output impedance while driving a plurality of couplers with the first current;
   means for providing a second current having a second phase for driving one or more of the plurality of couplers with the second current;
   means for sequentially driving each of the plurality of couplers with the second current while simultaneously driving the other couplers of the plurality of couplers with the first current;
   means for identifying a subset of the plurality of couplers based on detecting a change from the first output impedance; and
   means for selectively energizing the subset of the plurality of couplers via one or both of the means for providing the first current and the means for providing the second current to wirelessly transfer the charging power.

23. The apparatus of claim 22, further comprising means for adjusting an amount of wirelessly transferred power by selectively adjusting a number of couplers in the subset energized with the first current, the other couplers in the subset energized with the second current.

24. The apparatus of claim 22, further comprising means for adjusting the first output impedance of the means for providing the first current to a second output impedance by causing the means for providing the second current to energize one or more couplers of the subset with the second current while causing the means for providing the first current to energize the other couplers of the subset with the first current.

25. The apparatus of claim 22, further comprising means for electrically connecting the means for providing the first current to one or more of the plurality of couplers and electrically connecting the means for providing the second current to one or more other of the plurality of couplers.

26. The apparatus of claim 22, further comprising:
   means for adjusting the phase of the second current driving one coupler while the other couplers of the plurality of couplers are driven with the first current, and
   means for detecting a synchronous change in the output impedance of the means for providing the first current.

27. An apparatus for wirelessly transferring charging power, comprising:
   a plurality of couplers each configured to wirelessly couple the charging power to one or more receiver couplers;
   a first driver circuit configured to drive the plurality of couplers with a first current;
   a second driver circuit configured to drive the plurality of couplers with a second current; and
   a controller configured to:
   cause the first driver circuit to energize a subset of the plurality of couplers with the first current to wirelessly couple the charging power to a receiver coupler positioned to couple the charging power via the subset of the plurality of couplers, and
   adjust an output impedance presented to the first driver circuit by causing the second driver circuit to energize one or more couplers of the plurality of couplers not included in the subset of the plurality of couplers with the second current while causing the first driver circuit to energize the subset of the plurality of couplers with the first current.

28. The apparatus of claim 27, wherein the controller is configured to adjust the output impedance presented to the first driver circuit to a value that increases an efficiency of the first driver circuit from before the adjustment.

29. The apparatus of claim 27, wherein the first current and the second current have different phases.

30. The apparatus of claim 27, wherein the output impedance presented to the first driver circuit is a complex output impedance.

* * * * *